US008843576B2

(12) United States Patent  (10) Patent No.: US 8,843,576 B2
Srikrishna et al.  (45) Date of Patent: *Sep. 23, 2014

(54) IDENTIFYING AUDIO FILES OF AN AUDIO FILE STORAGE SYSTEM HAVING RELEVANCE TO A FIRST FILE

(75) Inventors: Devabhaktuni Srikrishna, San Francisco, CA (US); Marc A. Coram, Stanford, CA (US); Christopher Hogan, San Mateo, CA (US)

(73) Assignee: Python4Fun, Inc., San Mateo, CA (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/438,386

(22) Filed: Apr. 3, 2012

(65) Prior Publication Data

US 2013/0262596 A1 Oct. 3, 2013

(51) Int. Cl.
*G06F 15/16* (2006.01)
(52) U.S. Cl.
USPC .......................................................... 709/206
(58) Field of Classification Search
USPC .......................................................... 709/206
See application file for complete search history.

(56) References Cited

U.S. PATENT DOCUMENTS

| | | | |
|---|---|---|---|
| 5,752,020 A | 5/1998 | Ando | |
| 6,163,776 A * | 12/2000 | Periwal | 1/1 |
| 6,327,590 B1 | 12/2001 | Chidlovski et al. | |
| 6,981,210 B2 * | 12/2005 | Peters et al. | 715/234 |
| 7,707,088 B2 * | 4/2010 | Schmelzer | 705/35 |
| 8,533,232 B1 | 9/2013 | Hartman et al. | |
| 2004/0117732 A1 * | 6/2004 | McNeill et al. | 715/513 |
| 2005/0097173 A1 | 5/2005 | Johns et al. | |
| 2005/0216429 A1 | 9/2005 | Hertz et al. | |
| 2006/0271561 A1 * | 11/2006 | Schlachta-Fairchild et al. | 707/10 |
| 2007/0288455 A1 | 12/2007 | Hsu | |
| 2008/0109808 A1 | 5/2008 | Wing et al. | |
| 2008/0263103 A1 | 10/2008 | McGregor et al. | |
| 2009/0265737 A1 | 10/2009 | Issa et al. | |
| 2009/0287655 A1 | 11/2009 | Bennett | |
| 2009/0292685 A1 | 11/2009 | Liu et al. | |
| 2010/0145958 A1 | 6/2010 | Duffy et al. | |
| 2011/0035674 A1 * | 2/2011 | Chenoweth et al. | 715/745 |
| 2011/0087658 A1 | 4/2011 | Lunt | |
| 2011/0096014 A1 | 4/2011 | Fuyuno et al. | |

(Continued)

OTHER PUBLICATIONS

Response to Office Action Dated Jul. 16, 2013; U.S. Appl. No. 13/438,251, filed Apr. 3, 2012.

(Continued)

*Primary Examiner* — Kevin Bates
*Assistant Examiner* — Ronak Patel
(74) *Attorney, Agent, or Firm* — Brian R. Short

(57) ABSTRACT

Methods and systems for providing related audio files in an audio file storage system are disclosed. One method includes identifying a plurality of audio files within the audio file storage system, wherein the plurality of audio files each have a relationship with the first file, and wherein each audio file includes an audio and associated information. The method further includes generating, by a system server, a list of inquiries based on the plurality of audio files, providing, by the system server, the list of inquiries to at least one creator of the first file, receiving from the at least one creator at least one response to the list of inquiries, selecting a subset of the plurality of audio files based on the at least one response, and storing information related to the selected subset of the plurality of audio files.

39 Claims, 9 Drawing Sheets

(56) References Cited

U.S. PATENT DOCUMENTS

| | | |
|---|---|---|
| 2011/0119243 A1 | 5/2011 | Diamond et al. |
| 2011/0161345 A1 | 6/2011 | Dworkin et al. |
| 2011/0231104 A1 | 9/2011 | Lambert |
| 2011/0307491 A1 | 12/2011 | Fisk |
| 2011/0314049 A1 | 12/2011 | Poirer et al. |
| 2012/0066201 A1* | 3/2012 | Suman et al. ............. 707/710 |
| 2012/0078945 A1 | 3/2012 | Hurst |
| 2012/0084629 A1 | 4/2012 | Patrawala et al. |
| 2012/0113273 A1 | 5/2012 | Rothschild |
| 2012/0158747 A1 | 6/2012 | Satow et al. |
| 2012/0221687 A1* | 8/2012 | Hunter et al. ............. 709/219 |
| 2012/0233152 A1 | 9/2012 | Vanderwende et al. |

OTHER PUBLICATIONS

Response to Office Action Dated Jun. 27, 2013; U.S. Appl. No. 13/438,266, filed Apr. 3, 2012.

Response to Office Action Dated Jul. 2013; U.S. Appl. No. 13/438,358, filed Apr. 3, 2012.

Response to Office Action Dated Jun. 11, 2013; U.S. Appl. No. 13/438,225, filed Apr. 3, 2012.

* cited by examiner

200

Are any of the following updates to World Wide Web relevant to your paper? (i.e. Chronic Obstructive Pulmonary Disease : Effects beyond the Lungs)   _208_

● Yes, some of them are relevant   _204_   ○ No, none of them are relevant   _206_

Check all that apply – if checked use the text box below them to explain why it is related   _202_

Microalbuminuria and hypoxemia in patients with chronic obstructive pulmonary disease.(2010 Oct 15 PubMed) Found using (Celli) AND ("stable patients") - Albert Einstein, Professor of Physics, Princeton University, albert.einstein@princeton.edu, 113 Market St. Princeton, NJ   _218_

[X]  Relevant systemic effect

Addressing the complexity of chronic obstructive pulmonary disease: from phenotypes and biomarkers to scale-free networks, systems biology, and P4 medicine. (2011 May 1 PubMed) Found using ("celli") AND ("Review obstructive pulmonary")- Oppenheimer, Professor of Physics,   _212_
oppenheimer@ucberkeley.edu, University of California, 145 Main Street, Berkeley   _220_

_216_  Directly Relevant

[ ]  Involvement of endothelial apoptosis underlying chronic obstructive pulmonary disease-like phenotype in adiponectin-null mice: implications of therapy. (2011 May 1 PubMed)Found ("link between COPD") AND ("systematic inflammation")-William Shockley, Professor of Physics, william.shockley@mit.edu, Massachusetts Institute of Technology, 444 El Camino Real, Cambridge , MA

_210_

[X]  Comparison of biomarkers of subclinical lung injury in obstructive sleep apnea. (2010 Jul 11 PubMed)Found using ("lung-specific biomarker")-Albert Einstein, Professor of Physics, Princeton University, albert.einstein@princeton.edu, 113 Market St. Princeton, NJ

_214_

[ ] The link between periodontal disease and cardiovascular disease: How far we have come in the last two decades? (2010 Jul 11 PubMed)Found using ("link between COPD") AND ("Review   _222_
obstructive pulmonary")-William Shockley, Professor of Physics, william.shockley@mit.edu, Massachusetts Institute of Technology, 444 El Camino Real, Cambridge , MA

FIGURE 2

IDENTIFYING AUDIO FILES OF AN AUDIO FILE STORAGE SYSTEM HAVING RELEVANCE TO A FIRST FILE

FIELD OF EMBODIMENTS

The described embodiments relate generally to search results. More particularly, the described embodiments relate to methods, and systems for identifying audio files of an audio file storage system having relevance to a first file.

BACKGROUND

Search engines running on audio file storage systems use a variety of search techniques to present audio files or files embedded with audio to users based on one or more search terms that are provided by the users. The relevance of search results relate closely to the search terms, creators, or date created. The search engine generally produces a large number of results with audio files that include some irrelevant results and are difficult to sort for relevant audio files or audio files. Many suggested audio files are not relevant to the user. Relevant results are not always provided.

It is desirable to have methods and systems for providing a list of audio files related to the selected audio file, relevant to the subject matter of the selected audio file.

SUMMARY

One embodiment includes a method of automatically identifying one or more audio files in an audio file storage system related to a first file. The method includes identifying a plurality of audio files within the audio file storage system, wherein the plurality of audio files each have a relationship with the first file, wherein the audio file storage system provides a platform for storing and sharing audio files, and wherein each audio file includes an audio and associated information. The method further includes generating, by a system server, a list of inquiries based on the plurality of audio files, providing, by the system server, the list of inquiries to at least one creator of the first file, receiving from the at least one creator at least one response to the list of inquiries, selecting a subset of the plurality of audio files based on the at least one response, and storing information related to the selected subset of the plurality of audio files for access if the first file is selected.

Another embodiment includes providing the list of enquiries to more than one creator. In another embodiment, a different list of inquiries is provided to a first creator and other creators. The identified audio files are ranked based on the responses from all the creators and a subset of audio files is selected.

Other aspects and advantages of the described embodiments will become apparent from the following detailed description, taken in conjunction with the accompanying drawings, illustrating by way of example the principles of the described embodiments.

BRIEF DESCRIPTION OF DRAWINGS

In the following figures like reference numbers are used to refer to like elements. Although the following figures depict various examples, the one or more implementations are not limited to the examples depicted in the figures.

FIG. 2 shows an example list of inquiries presented to the creators.

DETAILED DESCRIPTION

The described embodiments are embodied in methods, and systems for providing a set of audio files to a user in an audio file storage system, where the set of audio files have relevance to the first file from a search or retrieval of a record identifying the first file.

Figure 1:
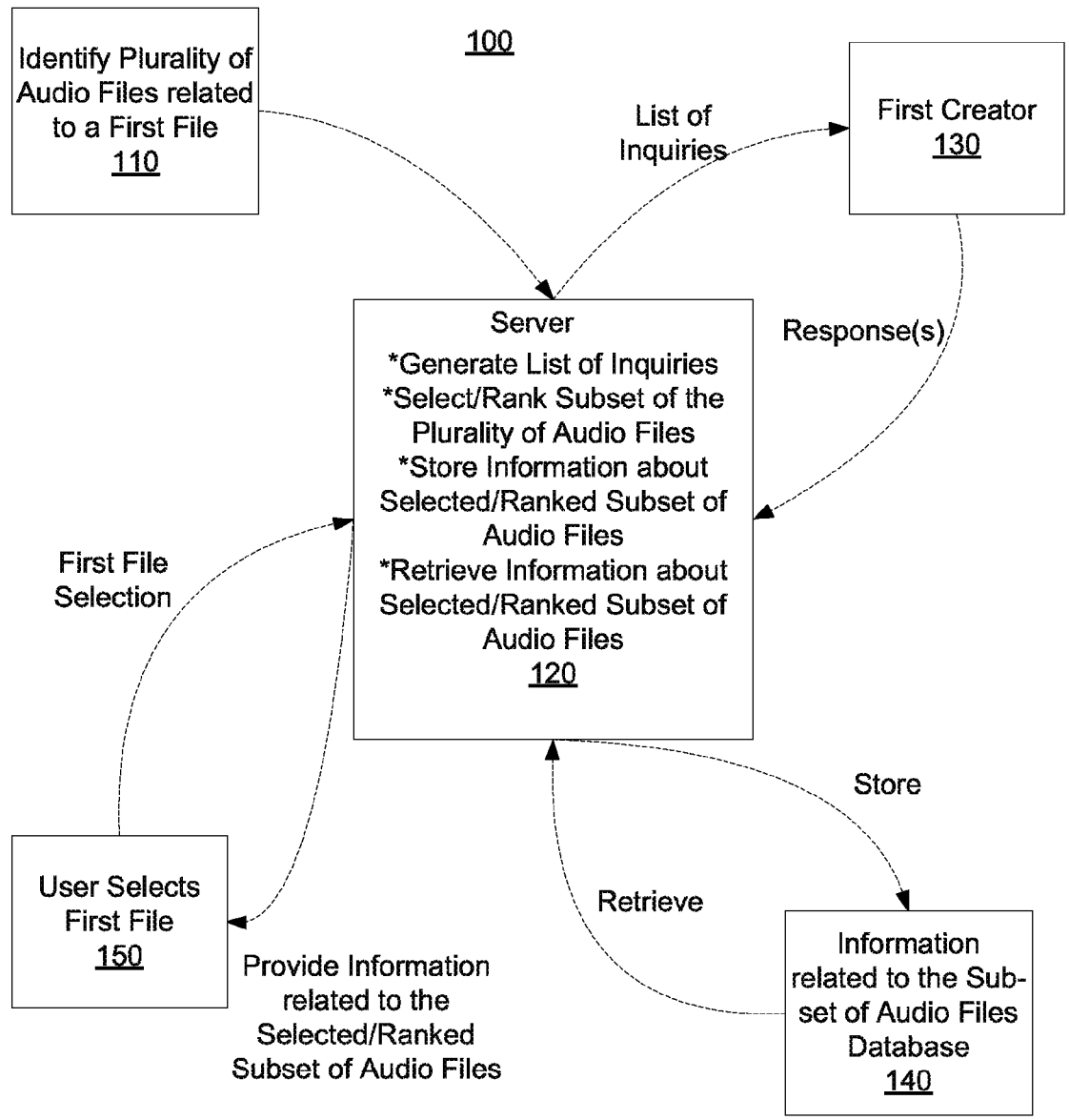
FIG. 1 is a block diagram of an embodiment of a system of providing related audio files from an audio file storage system, where a creator provides input to selecting/ranking a subset of audio files.

FIG. 1 is a block diagram of an embodiment of system 100, a system of providing related audio files from an audio file storage system, where a creator is involved in selecting/ranking a subset of audio files. In the described embodiments, audio and audio file may be interchanged to refer to a file in any audio format or any type of file with embedded music or lecture or podcast or streaming audio file or other audible file.

In at least some embodiments, an audio file storage system provides a platform for storing and sharing audio files, wherein each audio file includes an audio and associated information. For an embodiment, the associated information includes at least metadata. Users can send audio files and share the audio files. In an embodiment, the shared audio files have viewers or creators. Apple iTunes®, Google Music®, Spotify® and Amazon MP3® are all examples of audio file storage systems, each storing audio files or audio streams addressable at hyperlinks on the world wide web. The audio file storage system is accessible among the members of a group or on the World Wide Web. In an embodiment, any user may edit an audio file. In several embodiments, a first file is an audio file in the audio file storage system, or on the disk drive of the user system, or a file on the internet, or a file on any other file system identified to generate a list of related audio files. In several embodiments, the first file may be a recently added audio file to the audio file storage system, or identified due to a large number of audio files added to the audio file storage system in the same subject matter, or identified automatically for a periodic update of related audio files, or identified by any other method.

The audio file storage system is updated constantly as users add audio files to the audio file storage system. As the number of audio files grows large, existence of the audio file may not be known to many users if relevant hyperlinks to other audio files are not created. Creating hyperlinks is a manual task and often few audio files are hyperlinked together in an audio file storage system. Search engines provide access to the audio files that are not hyperlinked.

Unlike machine generated references using an algorithm running on a computer, the judgment of creators in selecting related audio files is valuable to other readers due to the creator's intrinsic understanding and motivation to identify materials related to the audio file written by that creator. In general, a creator or expert has greater interest and more precise understanding of the subject matter of what they wrote in their audio file compared to other readers. In several embodiments, a creator may be any of a creator of the audio file, a director, a narrator, a transcript creator, a sound technician, a music director, an expert on the subject matter or a team member, anyone who has write-privilege to the first file, or anyone who posts the file on a social network newsfeed.

Search engines list related audio files that are published before or after an audio file has been published. When an audio file is selected from the search results, a set of related audio files may be presented by the search engine. The set of related audio files are based on some criteria such as the number of hyperlinks an audio file has, common subject matter, and the frequency of certain phrases in the meta-data or text-transcription of the audio file. The number of hyperlinks is one of the criteria for search engines to list an audio file at the top of the related audio files. If an audio file has no hyperlinks, the search engine may not list an audio file at the top though the audio file may be relevant. The criteria for suggesting a list of related audio files can be improved by using an expert or creator to recommend the audio files through hyperlinks. The process of semi-automating the presentation of a list of related audio files is described in the embodiments.

A set of audio files related to the first file is identified in audio file storage system 110 by server 120. In one embodiment, identifying in audio file storage system 110 includes server 120 identifying a set of audio files related to the first file and receiving the list of identified audio files. In another embodiment, identifying in audio file storage system 110 includes server 120 receiving the list of identified audio files. In several embodiments, the set of identified audio files 110 can be the output of a natural language search or a text analysis on the meta-data or text-transcript of the audio file, or from collaborative filtering, or any other search technique. In several embodiments, the search can be based on a string of words, or a picture or a creator. The set of audio files is derived based on a relationship with the first file. The relationship can be any one of or some of creator of the first file, frequently used noun phrases in the meta-data or text-transcript of the audio file, date created later than the first file, a specific date created, or a date created after a specific date. Audio files published from a creator tend to have common subject matter. Frequently used noun-phrases in the first file are also keywords for searching related audio files. However, the occurrence of specific noun phrases in the audio file storage system may change with technology or over a period of time. Many search engines may not have the intelligence to recognize the changing noun phrases over a period of time. In some embodiments, the full-text of the meta-data or transcript is used for searching to yield more relevant related audio files. Audio files with date created later than the first file are valuable as users are generally interested in recent updates.

In an example, a search engine operating on server 120 uses the iTunes Store® API to identify related audio files in iTunes®, based on noun phrases in audio file meta data and text-transcript of the audio file. iTunes® is an audio file storage and transmission system. iTunes Store® API is a powerful application-programming interface that allows users to search for audio files on iTunes®. The algorithm used to generate the search terms automatically extracts noun phrases from an audio file using natural language processing tools and ranks them by the number of occurrences in the audio file meta-data compared to the number of occurrences on the audio file storage system. Server 120 generates a list of inquiries based on the set of audio files related to the first file. In an embodiment, the list of inquiries includes questions asking the creator whether the audio files are relevant to the first file, and the search terms used in keyword search or noun-phrase used to select the audio file.

FIG. 2 shows example 200, an inquiry generated using keyword search by iTunes Store® API in iTunes®. Selection of keyword search results displays related audio files. Example 200 shows the related audio files from keyword searches. In example 200, 202 is the subject of the first file. The first question summarizes the inquiry about relevant audio files. 204 is a check box next to a related audio file selected by a search engine. 206 is the date created of the related audio file. 208 is the search term used to identify the related audio file. 210 is an input box for the creator to enter the reason for the audio file being relevant. 212 shows the author who selected the profile as relevant. 214 shows the institution of the author. 216 shows the relationship tag, 218 shows the email address of the author, 220 shows the address and 222 shows the affiliation of the author. In one embodiment, the identity of the senders who selected each message thread is revealed to the user by displaying meta-data such as the sender's name, address, or contact information.

First creator 130 is notified of the list of inquiries generated by server 120. In the described embodiments, a first creator is the creator of the first file, an expert on the subject matter or a team member or anyone who has write-privilege to the first file. In the described embodiments, the notification can be sent electronically. In an embodiment, the notification email contains a hyperlink to a webpage that contains the list of inquiries. In another embodiment, the email contains the text of the inquiries. In another embodiment, the notification is sent by an email, or message on a social network such as Facebook® or Instant message system. In another embodiment, the notification is sent from a web-based interface such as Jive®, or LinkedIn® or Google Docs®. The creator completes the inquiry by selecting one or more audio files related to the first file in the opinion of the creator, and sends the response to the server using any of the notification methods described above. Server 120 receives the response to the inquiry from the creator and processes the response. The response includes a selection of audio files related to the first file. In an embodiment, the response includes a ranked list of the related audio files, identifying the relevance of the related audio files to the first file.

In an embodiment, audio files selected by the creator are ranked higher than the audio files not selected by the creator. A subset of the ranked audio files is selected. In another embodiment, all audio files selected by first creator 130 are selected. In another embodiment, a certain number of ranked audio files are selected. Server 120 creates a hyperlink between the first file and the subset of selected/ranked audio files in the audio file storage system. The hyperlink influences future search results of the engine when the first file or any of the subset of audio files is involved. Server 120 stores information about the subset of related audio files in a storage system 140. The information includes one or more of hyperlinks to the related audio files, ranking of the audio files, the creator of the first file, and metadata of the audio files. In the described embodiments, hyperlinks are references to audio files that connect the users to another audio file or a file or a portion of the audio file. In another embodiment, storage system 140 is a separate storage system. When a user selects the audio file identifier from the search results or any other listing, server 120 retrieves information about the selected/ranked related audio files. In an embodiment, the user is presented with a list of information about the related audio files as shown in FIG. 2. In one embodiment, the identity of the creators who selected each audio file is revealed to the user by displaying meta-data such as the creator's name, address, or contact information.

Figure 3:
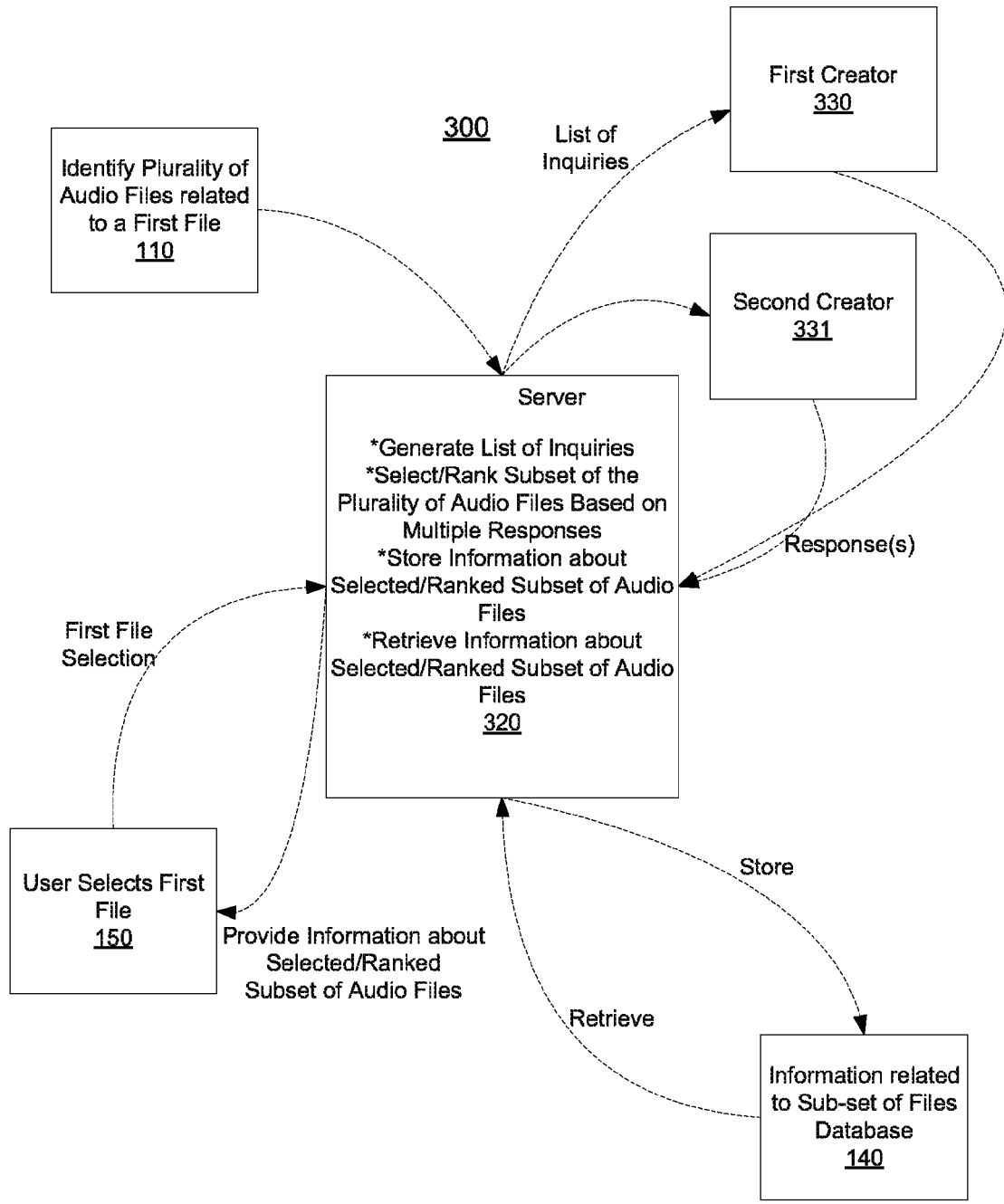
FIG. 3 is a block diagram of an embodiment of a system of providing related audio files, where more than one creator provides input to selecting/ranking a subset of audio files.

FIG. 3 is a block diagram of an embodiment of system 300, a system of providing related audio files, where more than one creator provides input to selecting/ranking a subset of audio files. A set of audio files related to the first file 110 is identified in audio file storage system by server 320. The set of audio files is derived based on a relationship such as creator, frequently used noun-phrases, and common subject matter with the first file. Server 320 generates a list of inquiries based on the set of audio files related to the first file. In an embodiment, the list of inquiries includes questions asking the creators whether the related audio files are relevant to the first file as determined by the search engine.

The list of inquiries generated by server 320 is notified to the first creator 330. The list of inquiries is also notified to second creator 331. In the described embodiments, the second creator is one or more creators other than the first creator. The first and second creators are notified electronically as described in conjunction with FIG. 1. Server 320 receives responses from the first creator as well as the second creator. The response includes a selection of audio files related to the first file. In an embodiment, the response includes a ranked list of the related audio files, identifying the relevance of the related audio files to the first file. In an embodiment, audio files are ranked based on the number of selections from the first and the second creators. In an embodiment, the audio files selected by the first creator are ranked higher than the audio files selected by second creator. In another embodiment, all responses are ranked with the same weight. In another embodiment, a certain number of ranked audio files are selected. In another embodiment, all audio files selected by the first creator and the second creator are selected.

Information about the selected/ranked audio files is stored in storage system 140. User selection of the first file identifier 150 from search results or any other listing is sent to server 320. In an embodiment, server 320 retrieves information about the selected/ranked list of related audio files from the audio file storage system before presenting to the user. In one embodiment, the identity of the creators who selected each audio file is revealed to the user by displaying meta-data such as the creator's name, address, or contact information.

Figure 4:
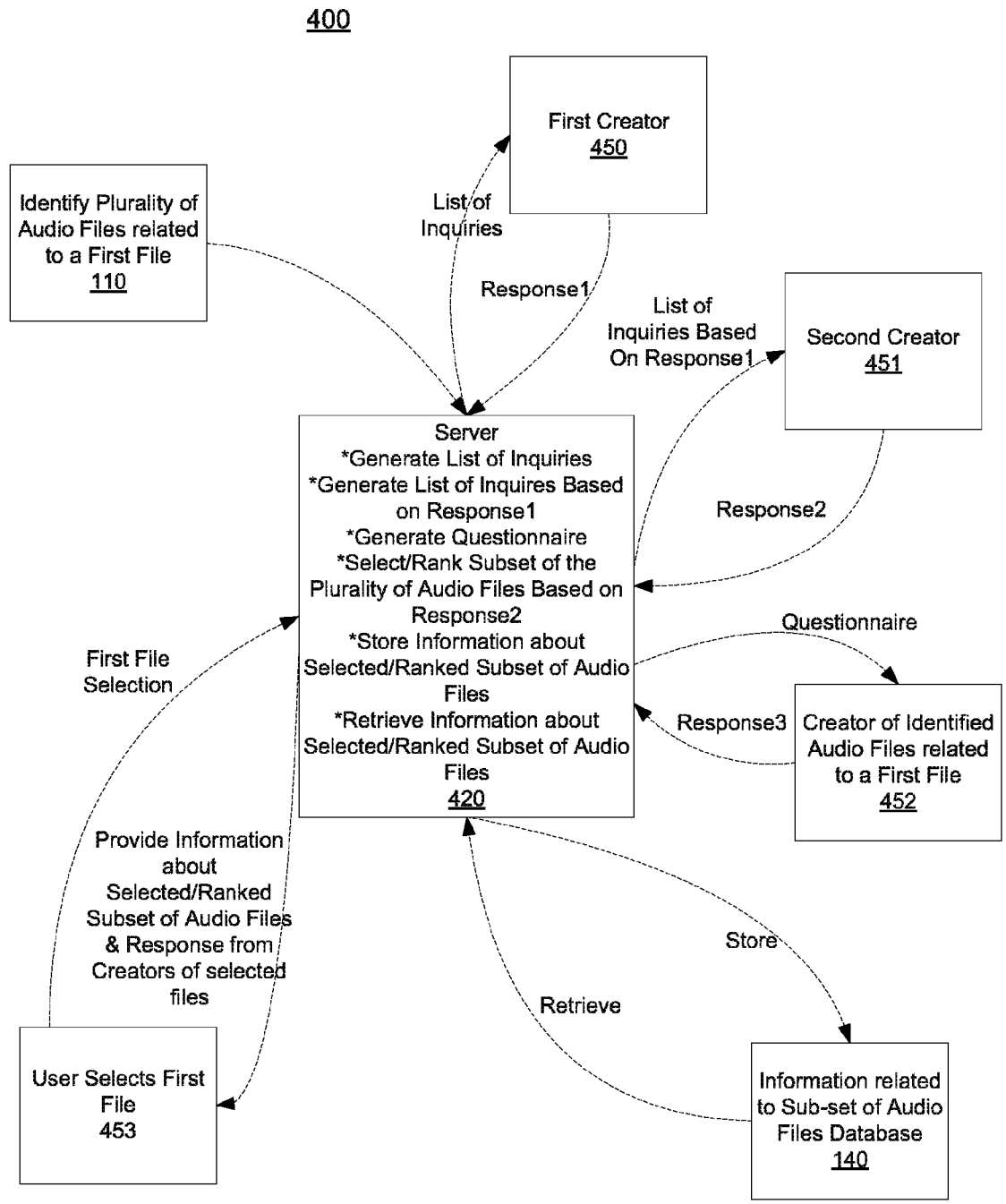
FIG. 4 is a block diagram of an embodiment of a system of providing related audio files in an audio file storage system, where more than one creator is involved in the selecting/ranking a subset of audio files and more than one list of inquiries is generated.

FIG. 4 is a block diagram of an embodiment of system 400, a system of providing related audio files, where more than one creator provides input to selecting/ranking a subset of audio files and more than one list of inquiries is generated. One or more audio files related to a first file are identified in an audio file storage system (similar to the description in conjunction with FIG. 1). A list of inquiries is generated by server 420 based on the identified audio files related to the first file. The list of inquiries includes questions asking the relevance of the related audio file to the first file. The list of inquiries is notified to a first creator 450. A first response is received from first creator 450 by server 420. The first response includes selection of audio files that are related to the first file in the opinion of the first creator 450. In an embodiment, the first response includes a ranked list of the related audio files, identifying the relevance of the related audio files to the first file. A second list of inquiries is generated based on the first response. The second list of inquiries includes questions about the selection of the audio files related to the first file by the first creator. In an embodiment, the second list of inquiries includes the related audio files and the search terms used to identify the related audio file or the noun-phrases used to identify the audio files.

Second creator 451 is notified electronically (by methods discussed in conjunction with FIG. 1) with the second list of inquiries. Server 420 receives the second response from second creator and analyzes the second response. The second response further refines the machine generated search results. The second response includes a selection of audio files related to the first file. In an embodiment, the second response includes a ranked list of the related audio files, identifying the relevance of the related audio files to the first file. Server 420 ranks a related audio file based on the number of selections from second creator. A subset of the ranked related audio files is selected. In an embodiment, all audio files selected by second creator are selected. In another embodiment, related audio files receiving a certain rank are selected.

In an embodiment, server 420 generates a questionnaire based on identified audio files related to the first audio 110. The questionnaire includes the opinion of one or more creators of the identified audio file about the selection as a related audio file to the first file. The questionnaire is notified to the creators of identified audio files 452. Server 420 receives response3 from the creators of identified audio files 452. In an embodiment, server 420 ranks an identified web page based on the number of selections from second creator 451 and the selection from the creator of identified audio files 452. A subset of the ranked related audio files is selected.

In an embodiment, all audio files selected by second creator are selected for ranking. In another embodiment, related audio files receiving a certain rank are selected. Information related to the selected/ranked audio files is stored in storage system 140. In an embodiment, the information related to the selected/ranked audio files includes one or more of hyperlinks to the selected audio file, the creator of the selected audio file, the title of the selected audio file, the creators, the opinion of the creator of the selected audio file, opinion of the creators of the first file, institution of the creator, the published date, and the selection/rank date. When a user selects the first file identifier 453, server 420 retrieves the information related to the selected related audio files from storage system 140. In several embodiments, information related to the subset of selected/ranked audio files is presented to the user shown in FIG. 2. In one embodiment, the identity of the creators who selected each audio file is presented to the user by displaying meta-data such as the creator's name, qualifications, institution, affiliation, address, or contact information. In another embodiment, information about the opinion of the creator of the selected audio file is presented to the user.

Figure 5:
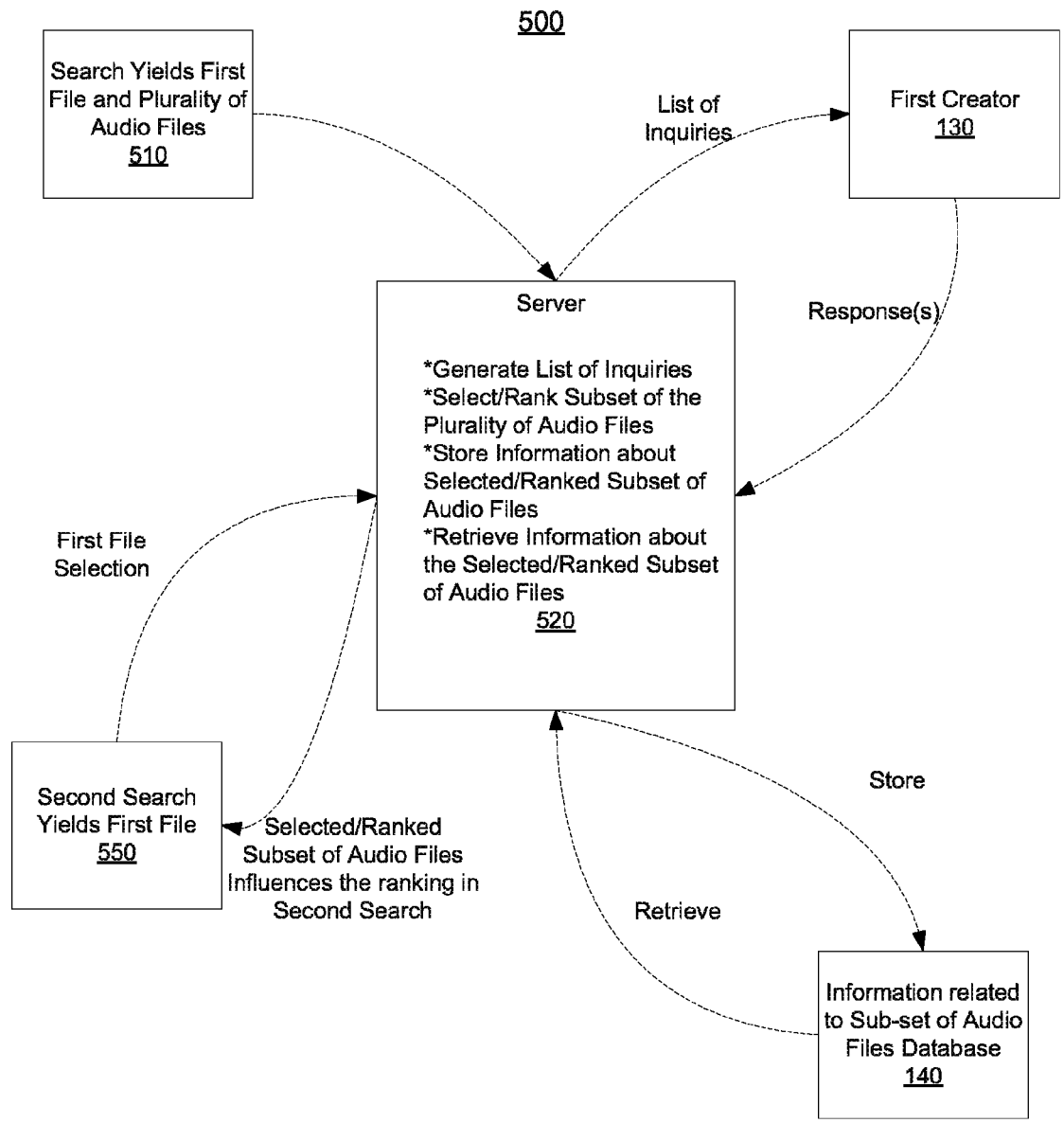
FIG. 5 is a block diagram of an embodiment of a system of providing related audio files, where a creator provides input to selecting/ranking a subset of audio files, where a search yields a first file.

FIG. 5 is a block diagram of system 500, an embodiment of a system of providing related audio file, where a creator is involved in the selecting/ranking a subset of audio files, where a search yields a first file. Server 520 searches for a first file in the audio file storage system. The search engine outputs a list of audio files 510 related to the first file based on search techniques described in conjunction with FIG. 1. Server 520 generates a list of inquiries based on the list of related audio files. The list of inquiries includes questions whether each of the audio files from search results are relevant to the first file.

The list of inquiries is notified to the first creator 130. A response is received from the creator. The response includes a selection of audio files related to the first file and optionally the reason for relevancy in the creator's opinion. In an embodiment, the response includes a ranked list of the related audio files, identifying the relevance of the related audio files to the first file. Server 520 ranks the related audio files based on the response from the creator. A subset of the ranked related audio files is selected. Server 520 stores information about the subset of selected/ranked audio files in a storage system 140. When a second search yields a plurality of search results containing the information identifying first file 550, server 520, retrieves the stored information about the subset of selected/ranked audio files and influences the ranking of the first audio relative the search results when presenting the search results to the user. In one embodiment, the identity of the creators who selected each audio file is revealed to the user by displaying meta-data such as the creator's name, address, or contact information.

Methods

Figure 6:
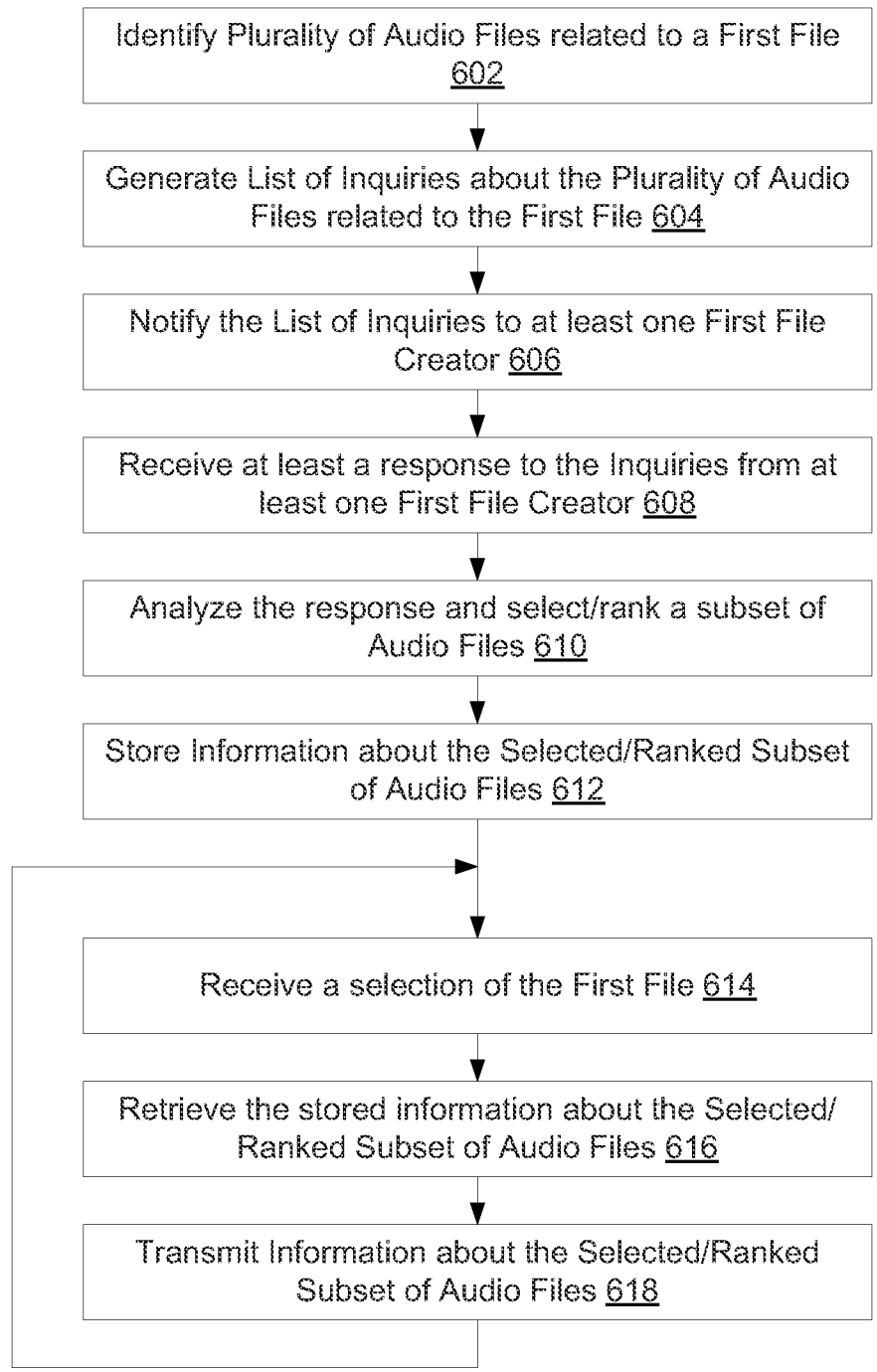
FIG. 6 is a flowchart that includes the steps of an example of a method of providing related audio files in an audio file storage system, where one or more creators provide input to selecting/ranking a subset of audio files.

FIG. 6 is a flowchart that includes the steps of an example of a method of providing related audio files, where a creator is involved in the selecting/ranking a subset of audio files. In step 602, the transcript or meta-data of the audio files in the audio file storage system is searched to identify one or more audio files that are related to a first file. In several embodiments, the search is based on any of or all of natural language search, machine language search, text analysis, or collaborative filtering. In an embodiment, the audio file storage system is searched for keywords that are automatically generated by the server. The keywords may be the creator/creators of the first file, frequently appearing words, creators of cited references in the first file, noun phrases based on subject matter, and subject. In an embodiment, the search is conducted on the full-text of the transcript or meta-data. In another embodiment, only the titles are searched. In an embodiment, only audio files created after the first file are searched. In embodiment, the algorithm used to generate the search terms using iTunes Store® API on iTunes® automatically extracts noun phrases from the first file using natural language processing tools and ranks them by the number of occurrences in the audio file meta-data compared to the number of occurrences on the audio file storage system.

In step 604, the server automatically generates a list of inquires based on the search results of step 602 to access the relevancy of the search result. The list of inquiries includes questions about each related audio file. In an embodiment, inquiries list the subject of one or more audio files identified in the search, the date created, and the search terms used to identify the audio file. Other embodiments may not list all the above items. FIG. 2 shows an example of the list of inquiries presented to creators. In step 606, the list of inquiries is notified to at least one creator of the first file. In the described embodiments, the notification can be sent electronically by an email, or message on a social network or instant message. Web based interface is another method of notifying the creator. In step 608, method 600 receives at least one response to the list of inquiries from the creators. The response includes a selection whether any of the audio files are relevant to the first file. In an embodiment, if any of the audio files are relevant, a selection of the relevant audio file and optionally the reason for the audio file being relevant are presented to the server. In an embodiment, the response includes a list of the related audio files, identifying the relevance of the related audio files to the first file. In step 610, method 600 analyzes the responses from the creators. The related audio files are ranked based on the number of selections received from the creators. A subset of the ranked related audio files is selected. In an embodiment, all audio files selected by the creators are selected. In another embodiment, a certain number of ranked audio files are selected. In another embodiment, audio files receiving certain rank are selected. Method 600 creates a hyperlink between the first file and the selected/ranked subset of audio files. The hyperlink can influence the search results in the audio file storage system when the first file is involved. In step 612, information about the selected/ranked audio files related to the first file is stored. The information about the selected/ranked audio files includes at least one of hyperlinks to the audio files in the audio file storage system, the rank of each audio file in the selected subset, metadata of the audio files. The information may be stored on the audio file storage system or any other storage system.

Steps 602-612 are performed to generate a list of selected/ranked audio files that may be more relevant than the machine generated references. In an embodiment, steps 602-612 are performed once. In another embodiment, steps 602-612 are performed at certain fixed intervals. In another embodiment, events such as addition of a certain number of audio files or a manual intervention may trigger steps 602-612.

In step 614, method 600 receives a selection of the first file identifier or information about the first file from a user. The audio file or information about the audio file may be selected from search results or from a list of audio files. The server retrieves the stored information about the selected/ranked audio files in step 616. In several embodiments, information about the related audio files is displayed to the user in step 618 shown in FIG. 2. In one embodiment, the identity of the creators who selected each audio file is revealed to the user by displaying meta-data such as the creator's name, email address, and contact information. Steps 614-618 are performed when a user selects the first file for display.

In an embodiment, each of the steps of method 600 may be a distinct step. In other embodiments, method 600 may not have all of the above steps and/or may have other steps in addition to or instead of those listed above. The steps of method 600 may be performed in another order. Subsets of the steps listed above as part of method 600 may be used to form their own method. In an embodiment, there could be multiple instances of method 600.

Figure 7:
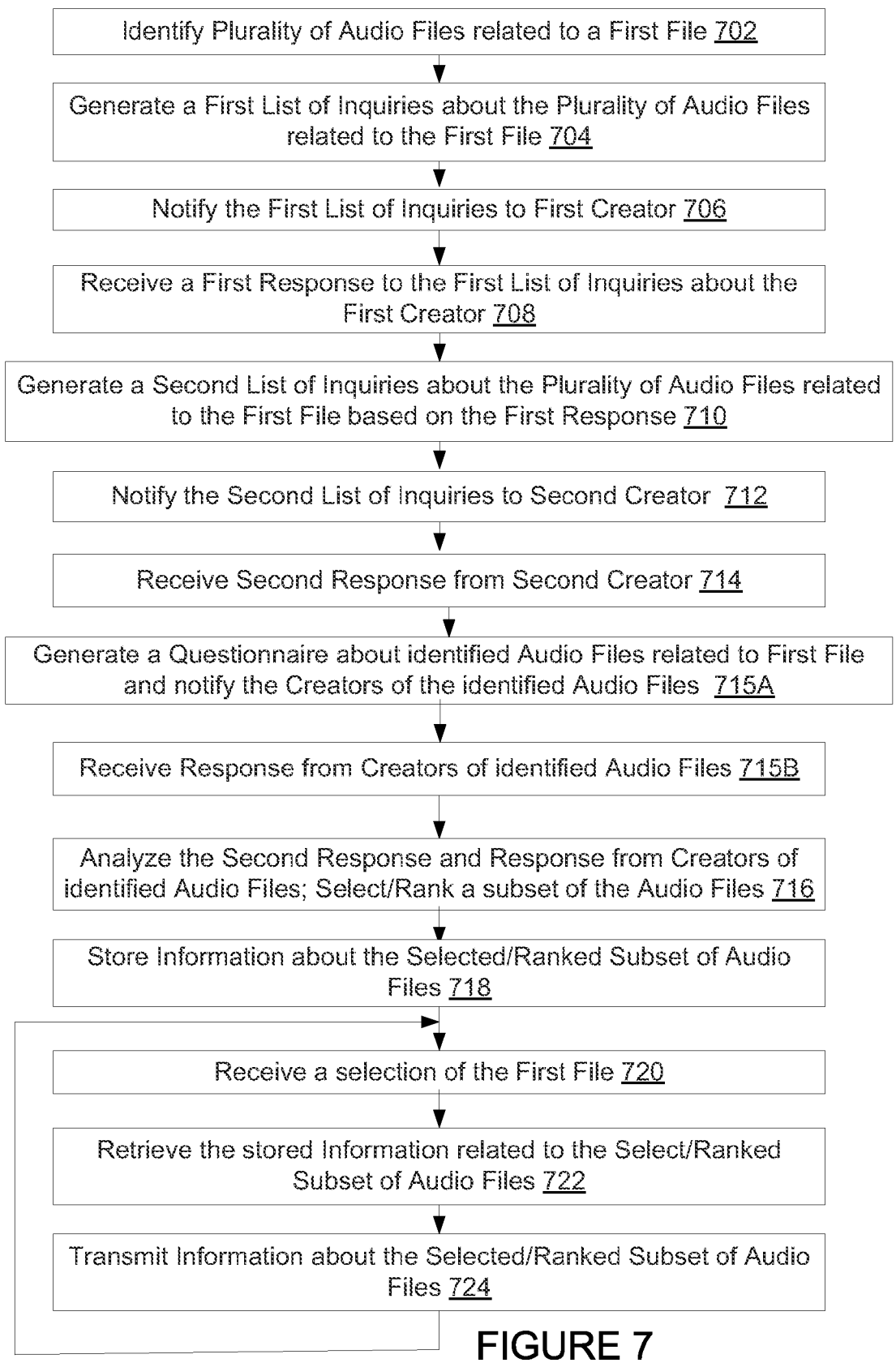
FIG. 7 is a flowchart that includes the steps of an example of a method of providing related audio files in a network, where more than one list of inquiries is generated and more than one creator is involved in the selecting/ranking a subset of audio files.

FIG. 7 is an example of a flowchart that includes the steps of method 700 of providing a list of related audio files, where more than one list of inquiries is generated and more than one creator is involved in the selecting/ranking a subset of audio files. In this method, at least two distinct lists of inquiries are generated, the first list of inquiries is sent to the first creator and the second list of inquiries is sent to the other creators. The second list of inquiries is generated based on the response from the first creator.

In method 700, a set of one or more audio files related to a first file is identified in step 702. In step 704, a first list of inquiries about the set of audio files identified in step 702 is generated. The first list of inquiries includes questions whether each of the identified audio files are related to the first file and optionally why they are related. In the described embodiment, steps 702 and 704 are similar to steps 602 and 604 respectively. The first list of inquiries is notified to a first creator of the first file in step 706. A first response to the first list of inquiries is received in step 708. The response includes a selection of audio files related to the first file and optionally the reason for the selection. In step 710, a second list of inquires based on the response from the first creator about the relevance of the set of audio files to the first file is generated.

In an embodiment, the second list of inquiries includes a list of audio files selected by the first creator for selecting audio files related to the first file. In an embodiment, the second list of inquires includes questions whether the second creator agrees with the first creator. In another embodiment, the second list of inquiries includes the reason for an audio file being relevant to the first file.

One or more second creator of the first file are notified with the second list of inquiries in step 712. In step 714, one or more second response is received from the second creator. In an embodiment, a questionnaire is generated based on the list of identified audio files in step 715A. The questionnaire includes whether the identified audio files are related to the first file. The questionnaire is notified to one or more creators of the plurality of identified audio files. In step 715B, server 520 receives response from one or more creators of the plurality of identified audio files. In step 716, the second response from the second creator is analyzed. In an embodiment, audio files are ranked based on the number of selections from the second creator. In another embodiment, audio files are ranked based on the response from creators of identified audio files in addition to the response from second creator. In an embodiment, the response includes identifying the relevance of the related web pages to the first file. In an embodiment, the response includes identifying the relevance of the related audio files to the first file. A subset of the ranked audio files is selected. In an embodiment, all audio files selected by the second creator are selected. In another embodiment, a certain number of ranked audio files or audio files with a certain rank are selected. Method 700 creates a hyperlink between the first file and the selected/ranked subset of audio files. The hyperlink can influence the search results in the audio file storage system when the first file is involved. In step 718, information about the selected/ranked subset of audio files related to the first file is stored in an audio file storage system. Steps 702-718 are performed to generate a list of selected/ranked audio files that may be more relevant than the machine generated referenced. In an embodiment, steps 702-718 are performed once. In another embodiment, steps 702-718 are performed at certain fixed intervals. In another embodiment, events such as addition of a certain number of audio files or a manual intervention may trigger steps 702-718.

In step 720, the server receives a selection of the first file identifier. Information about the related audio files of the first file stored in a storage system is retrieved in step 722. Information about the list of related audio files is presented to the user in step 724. Steps 720-724 are performed when a user selects the first file for display. Steps 718, 720, 722, and 724 are similar to steps 612, 614, 616, and 618 respectively. In an embodiment, each of the steps of method 700 may be a distinct step. In other embodiments, method 700 may not have all of the above steps and/or may have other steps in addition to or instead of those listed above. The steps of method 700 may be performed in another order. Subsets of the steps listed above as part of method 700 may be used to form their own method. In an embodiment, there could be multiple instances of method 700.

Figure 8:
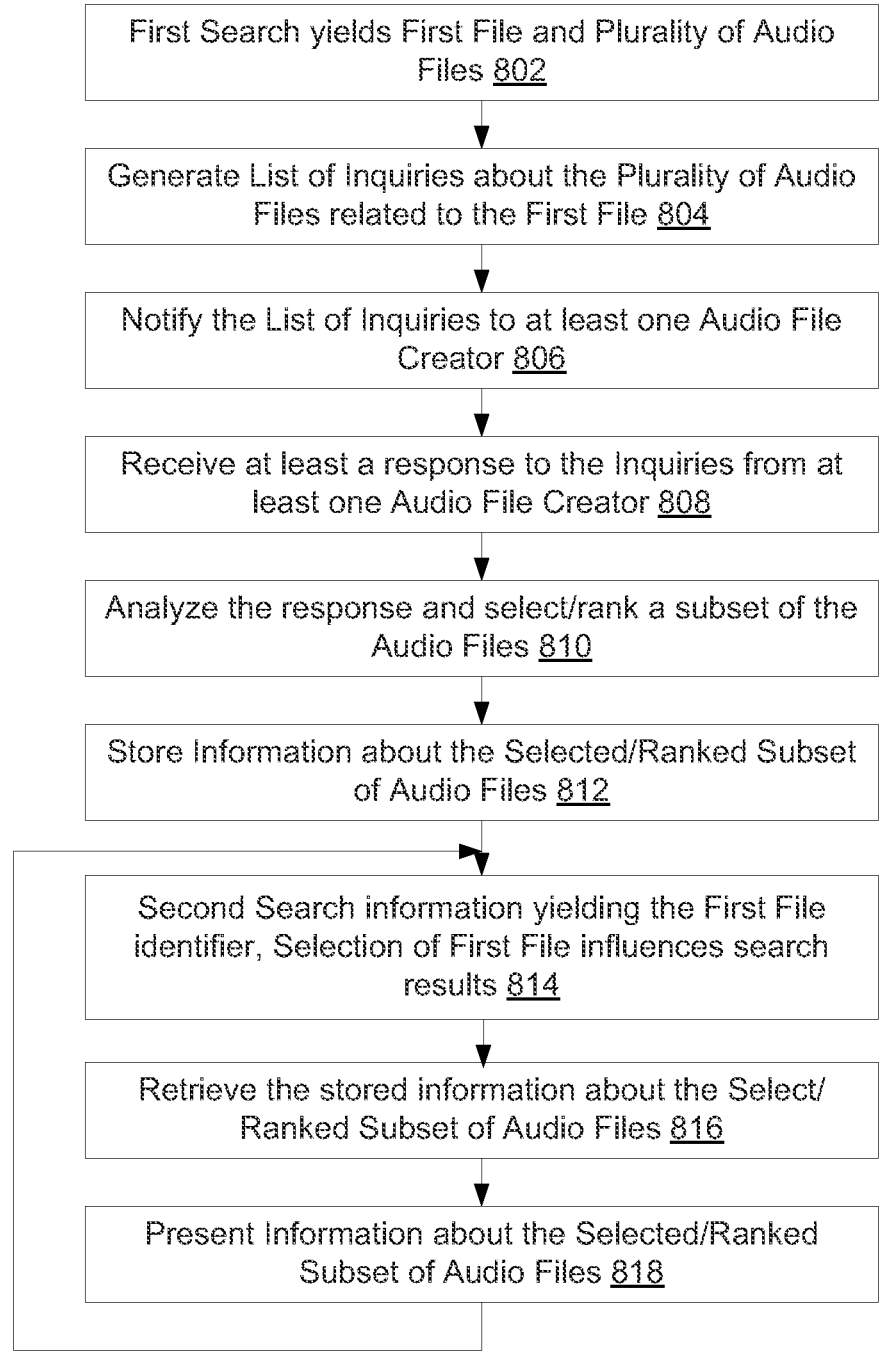
FIG. 8 is a flowchart of an example of a method of providing a list of related audio files, where a creator is involved in the selecting/ranking a subset of audio files, where a search yields a first file.

FIG. 8 is an example flowchart of method 800 of providing a list of related audio files, where a creator provides input to selecting/ranking a subset of audio files, and a search yields a first file. A first search in the audio file storage system using a search engine provides a list of audio files related to the first file in step 802. In embodiment, the algorithm used to generate the search terms using iTunes Store® API automatically extracts noun phrases from the first file meta-data using natural language processing tools and ranking them by the number of occurrences in the audio file meta-data compared to the number of occurrences in the audio file storage system. A list of inquiries is generated based on the audio files related to the first file in step 804. The list of inquiries includes whether each listed audio file from the search results is related to the first file and optionally the reason for being related.

In step 806, the list of inquiries is notified to one or more creators. In step 808, method 800, receives at least one response from the creators providing information about the relevancy of related audio files to the first file and optionally the reason for an audio file being related in the opinion of the creator. In step 810, the related audio files are ranked based on the number of selections from the creators. In an embodiment, the response includes a ranked list of the related audio files, identifying the relevance of the related audio files to the first file. A subset of the ranked audio files is selected. Information related to the subset of audio files is stored in a storage system in step 812. Method 800 creates a hyperlink between the first file and the selected/ranked subset of audio files. The hyperlink can influence the search results in the audio file storage system when the first file is involved. Steps 804, 806, 808, 810, and 812 may be similar to steps 604, 606, 608, 610 and 612. Steps 802-812 are performed to generate a list of selected/ranked audio files that may be more relevant than the machine generated referenced. In an embodiment, steps 802-812 are performed once. In another embodiment, steps 802-812 are performed at certain fixed intervals. In another embodiment, events such as addition of a certain number of audio files or a manual intervention may trigger steps 802-812.

A second search in the audio file storage system using a search engine yields a first file and the server receives a selection of the first file identifier in step 814. The selection of the first file can influence the search results of future searches. The server retrieves information about the related audio files (stored in step 812) from the storage system in step 816. In several embodiments, in step 818, information about the related audio files is presented to the user shown in FIG. 2. In one embodiment, the identity of the creators who selected each audio file is revealed to the user by displaying meta-data such as the creator's name, address, or contact information. Steps 814, 816, and 818 may be similar to steps 614, 616 and 618. Steps 814, 816, and 818 are repeated for every search yielding the first file. In an embodiment, each of the steps of method 800 may be a distinct step. In other embodiments, method 800 may not have all of the above steps and/or may have other steps in addition to or instead of those listed above. The steps of method 800 may be performed in another order. Subsets of the steps listed above as part of method 800 may be used to form their own method. In an embodiment, there could be multiple instances of method 800.

Identifying Related Audio Files

One or more audio files related to a first file in the audio file storage system are identified by server 120 or server 320 or server 420. In the described embodiments, the first file can reside in a creator system 922, or in the audio file storage system 920 or in server system 902. The related audio files are identified by natural language search, or text analysis, or from collaborative filtering, or any other search techniques. In an embodiment, server 120 or 320 or 420 extracts noun phrases from audio files in the audio file storage system using natural language processing tools and ranks them by the number of occurrences in the audio file compared to the number of occurrences in the audio file storage system. In one embodiment, server 520 searches the audio file storage system uses iTunes Store® API to automatically extract noun phrases from audio file meta-data in iTunes® using natural language processing tools and rank them by the number of occurrences in the meta-data compared to the number of occurrences in the audio file storage system.

Generation of List of Inquiries

In an embodiment, the list of inquiries generated by the system server includes one or more identified audio files related to a first file. In an embodiment, the inquiries include the search terms used in a search using text analysis or collaborative filtering. In another embodiment, the list of inquires includes one or more identified audio files and the noun-phrases from the first file used to identify the audio files. In an embodiment, the list of inquiries presented to the first creator includes one or more subjects of related of audio files, the search term used to identify the related audio files, the noun-phrases which are validated by their presence in the hyperlinks from the first file, the date created, the abstract and the unique identification. The list of inquiries for the second creator is influenced by a response received from the first creator. The list of inquiries to the second creator includes one or more of the selection of related audio files by the first creator, the search terms used to identify the related audio file, the noun-phases used in citation-validation techniques and the date created. In an embodiment, the list of inquiries includes one or more of the types of relationship tags of the identified audio file such as whether the identified audio file summarizes the first file, contradicts the first file, or complements the first file. In an embodiment, a questionnaire is generated to the creators of the identified audio files. The questionnaire may contain questions whether the identified audio file is related to the first file. The list of inquires is notified electronically to one or more creators. The notification comprises at least one of an email, messaging on a social network, instant audio or a web-based interface notification.

Selection and Ranking of Related Audio Files

The related audio files are ranked based on the number of selections from the creators. In an embodiment, a selection of the related audio files from each creator is ranked equally. In another embodiment, selection of an audio file from the first creator receives higher ranking. In another embodiment, selection of an audio file from a creator who responds to queries more often is ranked higher. In another embodiment, the selection by the creator of the identified audio files is ranked higher. In another embodiment, the selection of an audio file by the creator of the first creator and second creator of the audio file is ranked highest. A subset of the related audio files is selected. In an embodiment, all audio files selected by the creators are selected. In another embodiment, a certain number of the ranked audio files are selected. In another embodiment, audio files receiving a certain rank are selected.

In an embodiment of a method of identifying audio files of an audio file storage system having relevance to a first file, comprising identifying a plurality of audio files within the audio file storage system, wherein the plurality of audio files each have a relationship with the first file; generating, by a system server, a list of inquiries based on the plurality of audio files; providing, by the system server, the list of inquiries to at least one creator of the first file; receiving from the at least one creator at least one response to the list of inquiries; selecting a subset of the plurality of audio files based on the at least one response; storing information related to the selected subset of the plurality of audio files for access if the first file is selected. In an embodiment of a method wherein the at least one creator comprises at least one author of the first file. In an embodiment of a method further comprising generating, by the system server, a second list of inquiries based on the plurality of audio files; providing, by the system server, the second list of inquiries to at least one second creator of the plurality of audio files; receiving from the at least one second creator of the plurality of audio files at least one second response to the second list of inquiries; re-selecting the subset of the plurality of audio files based on the at least one response and the at least one second response; storing information related to the re-selected subset of the plurality of audio files for access if the first file is selected. In an embodiment of a method further comprising providing, by the system server, the selected subset of the plurality of audio files to a user that selects the first file and identifying the at least one creator to the user.

In an embodiment of a method wherein identifying the at least one creator comprises providing the user with the at least one creator's name, qualifications, institution, affiliation, address, or contact information. An embodiment of a method further comprising providing, by the system server, the selected subset of the plurality of audio files to a user that selects the first file and identifying the at least one creator of the first file, and the at least one creator of the plurality of audio files to the user, wherein identifying the at least one creator comprises providing the user with the at one of a name, qualifications, institution, affiliation, address, or contact information of the at least one creator shown in FIG. 2. An embodiment of a method further comprising providing a hyperlink between the first file and the selected subset of the plurality of audio files, wherein the hyperlink influences a ranking of search results that include at least one of the first file and the plurality of audio files.

An embodiment of a method wherein the plurality of audio files are each identified by a plurality of audio object searches, wherein each search identifies one of the plurality of audio files and the first file. An embodiment of a method wherein at least one of the plurality of audio object searches is refined by the at least one response. An embodiment of a method wherein at least one of the plurality of audio object searches uses a keyword search application programming interface to access audio files in the audio file storage system. An embodiment of a method wherein the list of inquiries includes search terms used in a search that identified the first file and the plurality of audio files, thereby establishing a relationship between the first file and the plurality of audio files by text analysis or collaborative filtering. An embodiment of a method wherein the search terms comprise strings of words. An embodiment of a method wherein the search terms comprise noun phrases. An embodiment of a method wherein the search terms comprise creator names cited by the first file. An embodiment of a method wherein the search terms comprise a term within the first file. An embodiment of a method the search is based on at least one of a word string, a creator, or an image. An embodiment of a method wherein the search terms are included within text of citations of the first file.

An embodiment of a method wherein each of the plurality of audio files includes a publication date, and wherein each of the publication dates is more recent than at least one of a first revision or a last revision date of the first file. An embodiment of a method wherein each of the plurality of audio files includes a publication date, and wherein each of the publication dates comprise a specific date. An embodiment of a method wherein each of the plurality of audio files includes a publication date, and wherein each of the publication dates comprise a date before a specific date. An embodiment of a method wherein the list of inquiries includes titles of at least a subset of the plurality of audio files. An embodiment of a method wherein the list of inquiries includes creators of at least a subset of the plurality of audio files.

An embodiment of a method wherein the at least one creator includes a first creator and a second creator, and wherein the list of inquiries for the first creator is influenced by a response received from the second creator. An embodiment of a method wherein the list of inquiries includes a relationship tag between at least one of the plurality of audio files and the first file. An embodiment of a method where in the relationship tag comprises at least one question of whether the relationship of the at least one the plurality of audio files to the first file is supportive, contradictory or summarizing. An embodiment of a method wherein providing the list of inquiries to the at least one creator of the first file comprises electronically communicating the list of inquires to the at least one creator using a notification. An embodiment of a method wherein the notification comprises at least one of an email, messaging on a social network, or instant message. An embodiment of a method wherein the notification comprises a web-based interface notification. An embodiment of a method wherein receiving from the at least one creator at least one response to the list of inquiries comprises receiving a selected subset of the plurality of audio files that the at least one creator selects as being relevant to the first file.

An embodiment of a method wherein receiving from the at least one creator at least one response to the list of inquiries comprises receiving a ranked list of at least a subset of the plurality of audio files that identifies an order of relevance of the at least the subset of the plurality of audio files to the first file. An embodiment of a method further comprising providing the at least one inquiry based on one response to at least one other creator, receiving from the at least one other creator at least one second response to the at least one response; re-selecting the subset of the plurality of audio files based on the at least one second response; storing information related to the re-selected subset of the plurality of audio files for access if the first file is selected. An embodiment of a method wherein the list of inquiries is provided to a plurality of creators, and responses received from each of the plurality of creators are compiled for selecting the subset of the plurality of audio files. An embodiment of a method wherein a plurality of lists of inquiries are provided to a plurality of creators, and responses received from each of the plurality of creators are compiled for selecting the subset of the plurality of audio files. An embodiment of a method further comprising the at least one creator having a permission to edit the first file. An embodiment of a method for a server to identify audio files having relevance to a first file, comprising receiving, by the server, a plurality of audio files, wherein the plurality of audio files were generated by a subject matter search; generating, by the server, a list of inquiries based on the plurality of audio files; providing, by the server, the list of inquiries to a creator of the first file, wherein the first file is a one of the plurality of audio files; receiving, by the server, from the creator at least one response to the list of inquiries; selecting, by the server, a subset of the plurality of audio files based on the at least one response; storing, by the server, the selected subset of the plurality of audio files for access if the first file is selected.

An embodiment of a method further comprising providing, by the server, the selected subset of the plurality of audio files to a user that selects the first file. An embodiment of a system for identifying audio files having relevance to a first file, comprising a server configured to present on a first display a list of inquiries to an identified creator of a first file, wherein the list of inquiries is based on a plurality of audio files; the server configured to receive from the identified creator at least one response to the list of inquiries; the server configured to select a subset of the plurality of audio files based on the at least one response; a server configured to present on a second display the selected subset of the plurality of audio files to a user that selects the first file. An embodiment of a programmable storage device readable by a machine, tangibly embodying a program of instructions when executed by the machine to perform a method of identifying audio files of an audio file storage system having relevance to a first file, the method comprising identifying a plurality of audio files within the audio file storage system, wherein the plurality of audio files each have a relationship with the first file; generating, by a system server, a list of inquiries based on the plurality of audio files; providing, by the system server, the list of inquiries to at least one creator of the first file; receiving from the at least one creator at least one response to the list of inquiries; selecting a subset of the plurality of audio files based on the at least one response; storing information related to the selected subset of the plurality of audio files for access if the first file is selected.

An embodiment of a method of identifying audio files of an audio file storage system having relevance to a first file, comprising identifying a plurality of audio files within the audio file storage system, wherein the plurality of audio files each have a relationship with the first file; generating, by a system server, a first list of inquiries based on the plurality of audio files; providing, by the system server, the first list of inquiries to at least one creator of the first file; receiving from the at least one creator of the plurality of audio files at least one first response to the first list of inquiries; generating, by the system server, a second list of inquiries based on the plurality of audio files; providing, by the system server, the second list of inquiries to at least one second creator of the plurality of audio files; receiving from the at least one second creator of the plurality of audio files at least one second response to the second list of inquiries; selecting a subset of the plurality of audio files based on the at least one first response and the at least one second response; storing information related to the selected subset of the plurality of audio files for access if the first file is selected. An embodiment of a method wherein the at least one creator comprises at least one creator of one of the plurality of audio files. An embodiment of a method wherein the information related to the selected subset of the plurality of audio files comprises an opinion of the at least one creator of either the first file or the plurality of audio files. An embodiment of a method further comprises providing the opinion of the at least one creator to a user that selects the first file.

System

Figure 9:
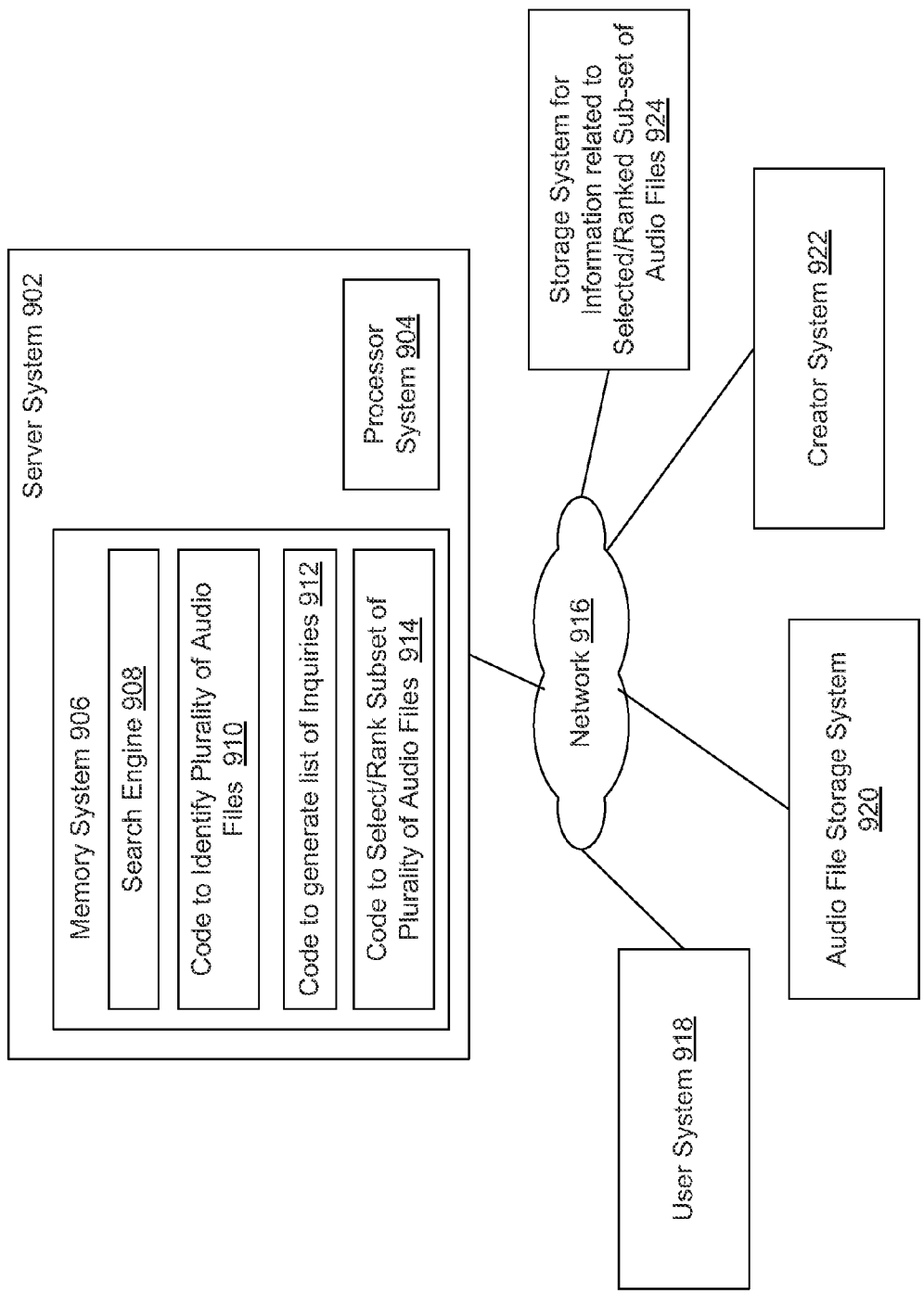
FIG. 9 shows an example of a block diagram of a system of providing related audio files to a search result in an audio file storage system.

FIG. 9 shows a block diagram of system 900, an embodiment of a system of providing related audio files to a search result. The system consists of server system 902, network 916, user system 918, audio file storage system 920, creator system 922, and storage system for information related to selected/ranked subset of audio files 924 among others. In other embodiments, system 900 may not have all of the elements or features listed and/or may have other elements or features instead of or in addition to those listed.

As shown in FIG. 9, for the described embodiments, server system 902 includes processor system 904 and memory system 906 among others. Server system 902 consists of on one or more servers connected to the network. Server system 902 can be a single unit, distributed in various locations, or virtualized. Processor system 904 may include any one of, some of, any combination of, or all of multiple parallel processors, a single processor, a system of processors having one or more central processors and/or one or more specialized processors dedicated to specific tasks. Also, processor system 904 may include one or more Digital Signal Processors (DSPs) in addition to or in place of one or more Central Processing Units (CPUs) and/or may have one or more digital signal processing programs that run on one or more CPU.

Memory system 906 may include, for example, any one of, some of, any combination of, or all of a long-term storage system, such as a hard drive; a short-term storage system, such as random access memory; a removable storage system, such as a floppy drive or a removable drive; and/or flash memory. Memory system 906 may include one or more machine-readable mediums that may store a variety of different types of information. The term machine-readable medium is used to refer to any medium capable carrying information that is readable by a machine. One example of a machine-readable medium is a computer-readable medium.

In an embodiment, memory system 906 stores code for search engine 908, code to identify plurality of audio files 910, code to generate a list of inquiries 912, and code to select/rank subset of plurality of audio files 914. Memory system 906 stores code for the search engine 906 to search the audio file storage system for audio files related to a first file and return the result to server system 902. In the described embodiments, the first file can reside in the audio file storage system 920, or creator system 922, or storage system for information related to selected/ranked subset of audio files 924 or memory system 906 or any other storage system. In an embodiment, the search engine searches the abstract of the transcript or the title of the transcript. In another embodiment, the search engine searches the entire transcript for keywords. The results from the search engine are ranked in order of relevancy. The relevancy may be the number of times the keyword appears in the transcript, and the number of hyperlinks.

The keywords for searching related audio files are supplied by the code to identify plurality of audio files 910. The keywords may be all of or some of frequently used noun phrases, the creator of the first file, the creators listed in the references cited in the first file, words from the title, date created, words related to subject matter. Once the server receives the list of audio files related to the first file, an inquiry is automatically generated by code to generate a list of inquiries/questionnaire 912 and sent to one or more creators. The list of inquiries is based on the search results. The inquiries include the relevancy of each of audio files listed as a related audio file to the first file, the reason for the audio file being related to the first file. Code to select/rank subset of plurality of audio files 914, selects a subset of the audio files from search results, stores information about the selected subset of audio files, and provides a hyperlink between the first file and the selected subset of audio files. Selection of audio files may also include ranking the audio files based on the number of selection from the creators. In an embodiment, responses from different creators can have different weight. Information related to the selected/ranked subset of audio files is stored. In an embodiment, the information related to the selected/ranked subset of audio files is stored on a storage system for information related to selected/ranked subset of audio files 924. In another embodiment, the information related to the selected/ranked subset of audio files is stored in memory system 906. In another embodiment, the information related to the selected/ranked subset of audio files is stored in the audio file storage system. In an embodiment, a hyperlink is created between the first file and the selected subset of audio files. The hyperlink influences the ranking of search results by the search engine when the first file is involved.

Network 916 is a network and/or combination of networks of devices that communicate with one another within an enterprise or on the Internet. User system 918 is a user device connected to the network 916. User system 918 selects an audio file from the audio file storage system. The audio file is selected from a search result or from a listing of audio files. Audio file storage system 920 is a shared storage system. All users can access the audio file storage system to read and in some cases contribute to the audio file storage system. Creator system 922 is a user system in the network. The creator system has read and write access to audio files in the audio file storage system. A creator of an audio file may be a producer of the audio file, the director of the audio file, the transcript creator, the narrator, co-creator of the file, an expert in the subject matter or a team member.

An embodiment includes a programmable storage device (such as memory system 906) readable by a machine (such as, processor system 904), tangibly embodying a program of instructions when executed by the machine to perform a method of identifying audio files of an audio file storage system having relevance to a first file. The method includes identifying a plurality of audio files within the audio file storage system, wherein the plurality of audio files each have a relationship with the first file, wherein the audio file storage system provides a platform for storing and sharing audio files, and wherein each audio file includes an audio and associated information. The method further includes generating, by a system server, a list of inquiries based on the plurality of audio files, providing, by the system server, the list of inquiries to at least one creator of the first file, receiving from the at least one creator at least one response to the list of inquiries, selecting a subset of the plurality of audio files based on the at least one response, and storing information related to the selected subset of the plurality of audio files for access if the first file is selected.

Although specific embodiments have been described and illustrated, the described embodiments are not to be limited to the specific forms or arrangements of parts so described and illustrated.

The invention claimed is:

1. A method of identifying audio files of an audio file storage system having relevance to a first file, comprising:
   identifying a plurality of audio files within the audio file storage system, wherein the plurality of audio files each have a relationship with the first file, wherein the audio file storage system provides a platform for storing and sharing audio files, and wherein each audio file includes an audio and associated information;
   generating, by a system server, a list of inquiries based on the plurality of audio files;
   providing, by the system server, the list of inquiries to at least one creator of the first file, wherein the list of inquiries includes search terms used in a search that identified the first file and the plurality of audio files, thereby establishing the relationship between the first file and the plurality of audio files by text analysis or collaborative filtering;
   receiving from the at least one creator at least one response to the list of inquiries;
   selecting a subset of the plurality of audio files based on the at least one response; and
   storing information related to the selected subset of the plurality of audio files for access if the first file is selected providing the selected subset of the plurality of audio files to a user that selects the first file; and
   identifying the at least one creator to the user.

2. The method of claim 1, wherein the at least one creator comprises at least one author of the first file.

3. The method of claim 1, further comprising:
   generating, by the system server, a second list of inquiries based on the plurality of audio files;

providing, by the system server, the second list of inquiries to at least one second creator of the plurality of audio files;

receiving from the at least one second creator of the plurality of audio files at least one second response to the second list of inquiries;

re-selecting the subset of the plurality of audio files based on the at least one response and the at least one second response;

storing information related to the re-selected subset of the plurality of audio files for access if the first file is selected.

4. The method of claim 1, wherein identifying the at least one creator comprises providing the user with a name, qualifications, institution, affiliation, address, or contact information of the at least one creator.

5. The method of claim 1, further comprising:
identifying the at least one creator of the plurality of audio files to the user, wherein identifying the at least one creator comprises providing the user with a name, qualifications, institution, affiliation, address, or contact information of the at least one creator.

6. The method of claim 1, further comprising providing a hyperlink between the first file and the selected subset of the plurality of audio files, wherein the hyperlink influences a ranking of search results that include at least one of the first file and the plurality of audio files.

7. The method of claim 1, wherein the plurality of audio files are each identified by a plurality of audio object searches, wherein each search identifies one of the plurality of audio files and the first file.

8. The method of claim 7, wherein at least one of the plurality of audio object searches is refined by the at least one response.

9. The method of claim 7, wherein at least one of the plurality of audio object searches uses a keyword search application programming interface to access audio files in the audio file storage system.

10. The method of claim 1, wherein the search terms comprise strings of words.

11. The method of claim 1, wherein the search terms comprise noun phrases.

12. The method of claim 1, wherein the search terms comprise creator names cited by the first file.

13. The method of claim 1, wherein the search terms comprise a term within the first file.

14. The method of claim 1, wherein the search is based on at least one of a word string, a creator, or an image.

15. The method of claim 1, wherein the search terms are included within text of citations of the first file.

16. The method of claim 1, wherein each of the plurality of audio files includes a publication date, and wherein each of the publication dates is more recent than at least one of a first revision or a last revision date of the first file.

17. The method of claim 1, wherein each of the plurality of audio files includes a publication date, and wherein each of the publication dates comprise a specific date.

18. The method of claim 1, wherein each of the plurality of audio files includes a publication date, and wherein each of the publication dates comprise a date before a specific date.

19. The method of claim 1, wherein the list of inquiries includes titles of at least a subset of the plurality of audio files.

20. The method of claim 1, wherein the list of inquiries includes the at least one creator of at least a subset of the plurality of audio files.

21. The method of claim 1, wherein the at least one creator includes a first creator and a second creator, and wherein the list of inquiries is for the first creator, and is influenced by a response received from the second creator.

22. The method of claim 1, wherein the list of inquiries includes a relationship tag between at least one of the plurality of audio files and the first file.

23. The method of claim 22, where in the relationship tag comprises at least one question of whether the relationship of the at least one the plurality of audio files to the first file is supportive, contradictory or summarizing.

24. The method of claim 1, wherein providing the list of inquiries to the at least one creator of the first file comprises electronically communicating the list of inquires to the at least one creator using a notification.

25. The method of claim 24, wherein the notification comprises at least one of an email, messaging on a social network, or instant message.

26. The method of claim 24, wherein the notification comprises a web-based interface notification.

27. The method of claim 1, wherein receiving from the at least one creator at least one response to the list of inquiries comprises receiving a selected subset of the plurality of audio files that the at least one creator selects as being relevant to the first file.

28. The method of claim 1, wherein receiving from the at least one creator at least one response to the list of inquiries comprises receiving a ranked list of at least a subset of the plurality of audio files that identifies an order of relevance of the at least the subset of the plurality of audio files to the first file.

29. The method of claim 1, further comprising:
providing the at least one inquiry based on one response to at least one other creator;
receiving from the at least one other creator at least one second response to the at least one response;
re-selecting the subset of the plurality of audio files based on the at least one second response;
storing information related to the re-selected subset of the plurality of audio files for access if the first file is selected.

30. The method of claim 1, wherein the list of inquiries is provided to a plurality of creators, and responses received from each of the plurality of creators are compiled for selecting the subset of the plurality of audio files.

31. The method of claim 1, wherein a plurality of lists of inquiries are provided to a plurality of creators, and responses received from each of the plurality of creators are compiled for selecting the subset of the plurality of audio files.

32. The method of claim 1, further comprising the at least one creator having a permission to edit the first file.

33. A method for a server to identify audio files having relevance to a first file, comprising:
receiving, by the server, a plurality of audio files, wherein the plurality of audio files were generated by a subject matter search;
generating, by the server, a list of inquiries based on the plurality of audio files;
providing, by the server, the list of inquiries to a creator of the first file, wherein the first file is a one of the plurality of audio files, wherein the list of inquiries includes search terms used in a search that identified the first file and the plurality of audio files, thereby establishing the relationship between the first file and the plurality of audio files by text analysis or collaborative filtering;
receiving, by the server, from the creator at least one response to the list of inquiries;
selecting, by the server, a subset of the plurality of audio files based on the at least one response;

storing, by the server, the selected subset of the plurality of audio files for access if the first file is selected;

providing the selected subset of the plurality of audio files to a user that selects the first file; and identifying the at least one creator to the user.

34. A system for identifying audio files having relevance to a first file, comprising:

a server configured to present on a first display a list of inquiries to an identified creator of a first file, wherein the list of inquiries is based on a plurality of audio files, wherein the list of inquiries includes search terms used in a search that identified the first file and the plurality of audio files, thereby establishing the relationship between the first file and the plurality of audio files by text analysis or collaborative filtering;

the server configured to receive from the identified creator at least one response to the list of inquiries;

the server configured to select a subset of the plurality of audio files based on the at least one response;

the server configured to present on a second display the selected subset of the plurality of audio files to a user that selects the first file;

the server configured to identify the at least one creator to the user.

35. A programmable storage device readable by a machine, tangibly embodying a program of instructions when executed by the machine to perform a method of identifying audio files of an audio file storage system having relevance to a first file, the method comprising:

identifying a plurality of audio files within the audio file storage system, wherein the plurality of audio files each have a relationship with the first file, wherein the audio file storage system provides a platform for storing and sharing audio files, and wherein each audio file includes an audio and associated information;

generating, by a system server, a list of inquiries based on the plurality of audio files;

providing, by the system server, the list of inquiries to at least one creator of the first file, wherein the list of inquiries includes search terms used in a search that identified the first file and the plurality of audio files, thereby establishing the relationship between the first file and the plurality of audio files by text analysis or collaborative filtering;

receiving from the at least one creator at least one response to the list of inquiries;

selecting a subset of the plurality of audio files based on the at least one response;

storing information related to the selected subset of the plurality of audio files for access if the first file is selected;

providing the selected subset of the plurality of audio files to a user that selects the first file; and identifying the at least one creator to the user.

36. A method of identifying audio files of an audio file storage system having relevance to a first file, comprising:

identifying a plurality of audio files within the audio file storage system, wherein the plurality of audio files each have a relationship with the first file, wherein the audio file storage system provides a platform for storing and sharing audio files, and wherein each audio file includes an audio and associated information;

generating, by a system server, a first list of inquiries based on the plurality of audio files;

providing, by the system server, the first list of inquiries to at least one creator of the first file, wherein the list of inquiries includes search terms used in a search that identified the first file and the plurality of audio files, thereby establishing the relationship between the first file and the plurality of audio files by text analysis or collaborative filtering;

receiving from the at least one creator of the plurality of audio files at least one first response to the first list of inquiries;

generating, by the system server, a second list of inquiries based on the plurality of audio files;

providing, by the system server, the second list of inquiries to at least one second creator of the plurality of audio files;

receiving from the at least one second creator of the plurality of audio files at least one second response to the second list of inquiries;

selecting a subset of the plurality of audio files based on the at least one first response and the at least one second response;

storing information related to the selected subset of the plurality of audio files for access if the first file is selected;

providing the selected subset of the plurality of audio files to a user that selects the first file; and identifying the at least one creator to the user.

37. The method of claim 36, wherein the at least one creator comprises at least one creator of one of the plurality of audio files.

38. The method of claim 36, wherein the information related to the selected subset of the plurality of audio files comprises an opinion of the at least one creator of either the first file or the plurality of audio files.

39. The method of claim 36, further comprises providing the opinion of the at least one creator to a user that selects the first file.

* * * * *